(12) United States Patent
Isono

(10) Patent No.: US 11,169,559 B2
(45) Date of Patent: Nov. 9, 2021

(54) PEDAL DEVICE FOR A VEHICLE

(71) Applicant: Toyota Jidosha Kabushiki Kaisha, Toyota (JP)

(72) Inventor: Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/154,333

(22) Filed: Jan. 21, 2021

(65) Prior Publication Data
US 2021/0232172 A1    Jul. 29, 2021

(30) Foreign Application Priority Data

Jan. 23, 2020 (JP) .............................. JP2020-009407

(51) Int. Cl.
*G05G 1/30* (2008.04)
*G05G 1/44* (2008.04)
(Continued)

(52) U.S. Cl.
CPC ............... *G05G 1/44* (2013.01); *B60K 26/02* (2013.01); *B60K 26/021* (2013.01); *B60T 7/042* (2013.01); *G05G 1/305* (2013.01); *G05G 1/38* (2013.01); *G05G 5/03* (2013.01); *G05G 5/05* (2013.01); *G05G 2505/00* (2013.01)

(58) Field of Classification Search
CPC ........... G05G 1/30; G05G 1/44; G05G 1/445; G05G 1/46; G05G 5/03; G05G 5/05; B60T 7/04; B60T 7/60; B60K 26/02; B60K 26/021
See application file for complete search history.

(56) References Cited

U.S. PATENT DOCUMENTS 3,838,662 A * 10/1974 McCalister ............ B60K 26/02
                                            116/205
4,915,075 A *  4/1990 Brown .................... B60K 26/02
                                            123/399
(Continued)

FOREIGN PATENT DOCUMENTS

DE         2603651 A1 *  9/1976 ............. B60K 26/02
DE       10238483 A1 *  3/2004 ............. B60K 31/18
(Continued)

OTHER PUBLICATIONS

Machine Translation of DE 2603651, obtained Jul. 2, 2021.*
Machine Translation of DE 10238483, obtained Jul. 2, 2021.*

*Primary Examiner* — Richard W Ridley
*Assistant Examiner* — Brian J McGovern
(74) *Attorney, Agent, or Firm* — Dinsmore & Shohl LLP

(57) ABSTRACT

A pedal device for a vehicle includes a first link that is pivotally supported at one end and receives a pedaling force of a driver, a return spring that biases the first link toward a standard position, a second link supported so as to be pivotable in a direction opposite to that of the first link, and a third link transmitting force and displacement between the first and second links. The return spring has a first and second ends connected to the first and second links, respectively, A moment in which a tensile force of the return spring pivots the first link toward the standard position is greater than a moment in which the tensile force of the return spring pivots the first link away from the standard position via the first end.

9 Claims, 5 Drawing Sheets

(51) Int. Cl.
*B60K 26/02* (2006.01)
*B60T 7/04* (2006.01)
*G05G 5/05* (2006.01)
*G05G 1/38* (2008.04)
*G05G 5/03* (2008.04)

(56) References Cited

U.S. PATENT DOCUMENTS

| | | | | |
|---|---|---|---|---|
| 5,133,225 A | * | 7/1992 | Lundberg | B60K 26/02 |
| | | | | 74/560 |
| 10,946,741 B1 | * | 3/2021 | Kim | B60K 26/02 |
| 2004/0089490 A1 | * | 5/2004 | Yamanoi | B60R 22/48 |
| | | | | 180/271 |
| 2005/0011301 A1 | * | 1/2005 | Furuta | G05G 1/445 |
| | | | | 74/560 |

FOREIGN PATENT DOCUMENTS

| | | | | | |
|---|---|---|---|---|---|
| GB | 301943 A | * | 12/1928 | | B60T 7/04 |
| GB | 872854 A | * | 7/1961 | | G05G 7/04 |
| JP | H07205776 A | | 8/1995 | | |
| JP | 2017-049892 A | | 3/2017 | | |

\* cited by examiner

PEDAL DEVICE FOR A VEHICLE

CROSS-REFERENCE TO RELATED APPLICATION

This application claims priority to Japanese Patent Application No. JP2020-009407 filed on Jan. 23, 2020, the content of which is hereby incorporated by reference in its entirety into this application.

BACKGROUND

1. Technical Field

The present disclosure relates to a pedal device for a vehicle such as an automobile.

2. Description of the Related Art

In vehicles such as automobiles, a so-called organ-type pedal device is used as an accelerator pedal device that is depressed by a driver. The organ type pedal device includes a link in which one end is pivotally supported by a supporting member so as to be pivotable about an axis and the other end is depressed, and a return spring that biases the link about the axis toward a standard position where its pivoting is zero.

For example, in Japanese Patent Application Laid-open No. 2017-49892, an organ type pedal device is described in which a link has an arm that is integrally provided with the link and extends in an arc shape about an axis, and a return spring is a compression coil spring that presses the arm in a direction in which an amount of pivotal movement of the link decreases. The arm is provided with a stopper, and a support member that pivotally supports the link is provided with an engagement portion. When a paddling force is not applied to the link, the stopper engages with the engagement portion so that the link is positioned at a standard position.

In the organ type pedal device, generally, a pivot shaft is provided at one end of the link, and the pivot shaft is inserted directly into holes provided in the support member or into a hole of a bush supported by the support member, whereby the link is pivotally supported by the support member so as to be pivotable at the one end. Since the pivot shaft must be able to rotate with respect to the support member, there is a slight clearance between the pivot shaft and the holes provided in the support member or the hole provided in the bush.

When the pedal device is used for a long period of time, a surface of the pivot shaft and a surface of the hole supporting the pivot shaft are worn, and the clearance between the hole and the pivot shaft becomes large. Therefore, when the pedal device is depressed by a driver, the link may rattle due to the pivot shaft being displaced in the hole in the direction perpendicular to the axis with respect to the support member.

It is conceivable to provide a pressing device that presses the pivot shaft in a direction perpendicular to the axis of the pivot shaft to press the pivot shaft against a wall surface of the hole so that the link does not rattle even when the pedal device is used for a long period of time. However, the provision of the pressing device inevitably complicates the structure of the pedal device and increases the cost of the pedal device.

SUMMARY

The present disclosure provides a pedal device for a vehicle that is improved, by pressing a pivot shaft with a return spring that urges a link toward a standard position, so that the pivot shaft does not cause rattling over a long period of time without increasing the complication of the structure and the cost of the pedal device.

According to the present disclosure, a pedal device for a vehicle is provided which includes a first link that is pivotally supported by a support member at one end so as to be pivotable about a first axis of a pivot shaft inserted into at least one hole and receives a pedaling force of a driver at a portion on the other end side with respect to the first axis, and a return spring that biases the first link about the first axis toward a standard position in which a pivot angle of the first link is zero.

The pedal device for a vehicle further includes a second link pivotally supported by the support member so as to be pivotable about a second axis parallel to the first axis, and a third link configured to pivot the second link about the second axis hi a direction opposite to that of the first link by transmitting force and displacement between the first link and the second link. The return spring is a spring that generates a tensile force by being elastically extended as compared with a free state, and has a first end connected to the first link on the side of the first axis with respect to a position at which force and displacement are transmitted between the first link and the third link and a second end connected to the second link at a position spaced from the second axis. A moment in which a tensile force of the return spring pivots the first link toward the standard position via the second and third links is greater than a moment in which the tensile force of the return spring pivots the first link away from the standard position via the first end.

According to the above configuration, the second link is pivotally supported by the support member about the second axis parallel to the first axis, and the third link is configured to pivot the second link about the second axis in a direction opposite to that of the first link by transmitting force and displacement between the first link and the second link. The return spring that produces a tensile force has first and second ends, and the first end is connected to the first link on the side of the first axis with respect to a position at which force and displacement are transmitted between the first link and the third link, and the second end is connected to the second link at a position spaced from the second axis.

Further, a moment (referred to as the second moment) in which the tensile force of the return spring pivots the first link to the standard position via the second and third links is larger than a moment (referred to as the first moment) in which the tensile force of the return spring pivots the first link away from the standard position via the first end.

As a result, the first link is biased to the standard position by a difference between the second moment and the first moment. Therefore, when the first link is pivoted about the first axis by a driver, a reaction force against the pivoting can be applied, and the first link can be reliably returned to the standard position when a pedaling force of the driver is released.

When the first link is pivoted about the first axis by the driver, a pedaling force is applied to the first link by the driver so that a force that overcomes a force transmitted from the return spring to the first link via the second and third links acts on the third link from the first link. On the other hand, a force transmitted to the first link via the first end is not affected by the pedaling force applied to the first link by the driver. Accordingly, the force transmitted to the first link via the first end maintains the pivot shaft and a surface of the hole receiving the pivot shaft pressed to each other. Therefore, it is possible to prevent the rattling of the first link due to the relative displacement of the pivot shaft in the direction perpendicular to the first axis with respect to the hole receiving the pivot shaft when the first link is pivoted.

Thus, the return spring performs both functions of urging the first link to the standard position and keeping the pivot shaft and the surface of the hole receiving the pivot shaft pressed to each other to prevent the rattling of the first link. Therefore, it is not necessary to additionally provide techniques for preventing the rattling of the first link in addition to the return spring, so that the rattling can be prevented over a long period of time without increasing the complexity of the structure and the cost of the pedal device.

In one aspect of the present disclosure, the first end is connected to the first link between a position at which force and displacement are transmitted between the first link and the third link and the first axis.

According to the above aspect, the first end of the return spring connected to the first link is located between the first axis and a position at which force and displacement are transmitted between the first link and the third link. Therefore, even if the first link pivots, the tensile force of the return spring, which is transmitted to the first link through the first end, does not generate a moment that pivots the first link to the standard position in the same manner as the second moment. Accordingly, in a situation where the driver applies a pedaling force to the first link, it is possible to prevent the rattling of the first link from being caused due to the force transmitted to the first link via the first end failing to press the pivot shaft and the surface of the hole receiving the pivot shaft to each other.

In another aspect of the present disclosure, the first end is located on a straight line connecting the first axis and the second end when a pivot angle of the first link is a maximum allowable angle.

According to the above aspect, the first end of the return spring connected to the first link is located on the straight line connecting the first axis and the second end when the pivot angle of the first link is the maximum allowable angle. Therefore, as compared to where the first end is closer to the other end of the first link than the straight line connecting the first axis and the second end even when the pivoting angle of the first link is the maximum allowable angle, it is possible to reduce the first moment and increase a force that presses the pivot shaft and the surface of the hole receiving the pivot shaft to each other by the force transmitted to the first link via the first end. Accordingly, the first link can be effectively returned to the standard position, and rattling of the first link can be effectively prevented.

Further, in another aspect of the present disclosure, a distance between the first end and the first axis is less than a distance between the second end and the second axis, a ratio of a pivot angle of the second link to a pivot angle of the first link is greater than 1, and a distance between the first and second ends increases as the pivot angle of the first link increases.

According to the above aspect, a distance between the first end and the first axis is smaller than a distance between the second end and the second axis. The ratio of the pivot angle of the second link to the pivot angle of the first link is greater than 1. Further, as the pivot angle of the first link increases, a distance between the first end and the second end increases. Therefore, the tensile force of the return spring increases as the pivot angle of the first link increases, so that the force for returning the first link to the standard position can be increased and the effect of preventing the rattling of the first link can be increased.

Further, in another aspect of the present disclosure, the support member is provided with a stopper, and, when the first link does not receive a pedaling force of the driver, the second link engages with the stopper at a position spaced from the second axis, whereby the first link is positioned in the standard position and the second link is positioned in its standard position.

According to the above aspect, when the first link does not receive the pedaling force of the driver, the second link engages with the stopper at the position spaced from the second axis, thereby the first link and the second link are positioned in their respective standard positions. Therefore, a stopper that engages with the first link at a portion spaced apart from the first axis is not required, so that the structure of the first link can be simplified.

Further, in another aspect of the present disclosure, the pedal device for a vehicle is provided with a detection device that is configured to detect at least one of a pivot angle of the second link about a second axis and a torque of the second link about the second axis.

According to the above aspect, at least one of a pivot angle of the second link about the second axis and a torque of the second link about the second axis is detected by the detection device. The pivot angle of the second link has a certain relationship with the pivot angle of the first link and a stroke of the portion of the first link that receives the pedaling force, and the torque of the second link about the second axis has a certain relationship with a torque of the first link about the first axis and the pedaling force applied to the first link. Therefore, it is possible to detect at least one of the pivot angle of the first link, a stroke of the portion of the first link that receives the pedaling force, the torque of the first link, and the pedaling force applied to the first link.

Further, in another aspect of the present disclosure, the pedal device for a vehicle is provided with a reaction force device that is supported by the support member and is configured to generate a reaction force that urges the second link in a direction in which a pivot angle of the second link decreases.

According to the above aspect, by a reaction force generated by the reaction force device supported by the support member, the second link is urged in a direction in which the pivot angle thereof decreases, and a biasing force due to the reaction force is also transmitted to the first link via the second link and the third link, and biases the first link to the standard position. Thus, the first link is urged to the standard position by both an urging force by the tensile force of the return spring and an urging force by the reaction force generated by the reaction force device. Therefore, the first link can be effectively biased to the standard position without increasing the tensile force of the return spring, which enables to increase the degree of freedom in setting the force for pressing the pivot shaft and the surface of the hole receiving the pivot shaft to each other by a force transmitted to the first link via the first end.

Further, in another aspect of the present disclosure, the third link is a connecting link pivotally attached to the first link at one end and pivotal y attached to the second link at the other end.

According to the above aspect, the third link is the connecting link pivotally attached to the first link at one end and pivotally attached to the second link at the other end. Thus, the connecting link can transmit force and displacement between the first link and the second link, causing the second link to pivot about the second axis in the direction opposite to that of the first link.

Further, in another aspect of the present disclosure, the third link includes a roller rotatably supported by the second link about a rotation axis parallel to the second axis, and a roller contact surface provided on the first link, and the roller is configured to roll in contact with the roller contact surface when the first link pivots about the first axis.

According to the above aspect, when the first link pivots about the first axis, the roller, which rotatably supported by the second link about the rotation axis parallel to the second axis, rolls in contact with the roller contact surface provided on the first link. Therefore, the roller and the roller contact surface cooperate with each other to function as a third link that transmits force and displacement between the first link and the second link, and can pivot the second link about the second axis in the direction opposite to that of the first link.

Other objects, other features and attendant advantages of the present disclosure will be readily understood from the description of the embodiments of the present disclosure described with reference to the following drawings.

DETAILED DESCRIPTION

Figure 1:
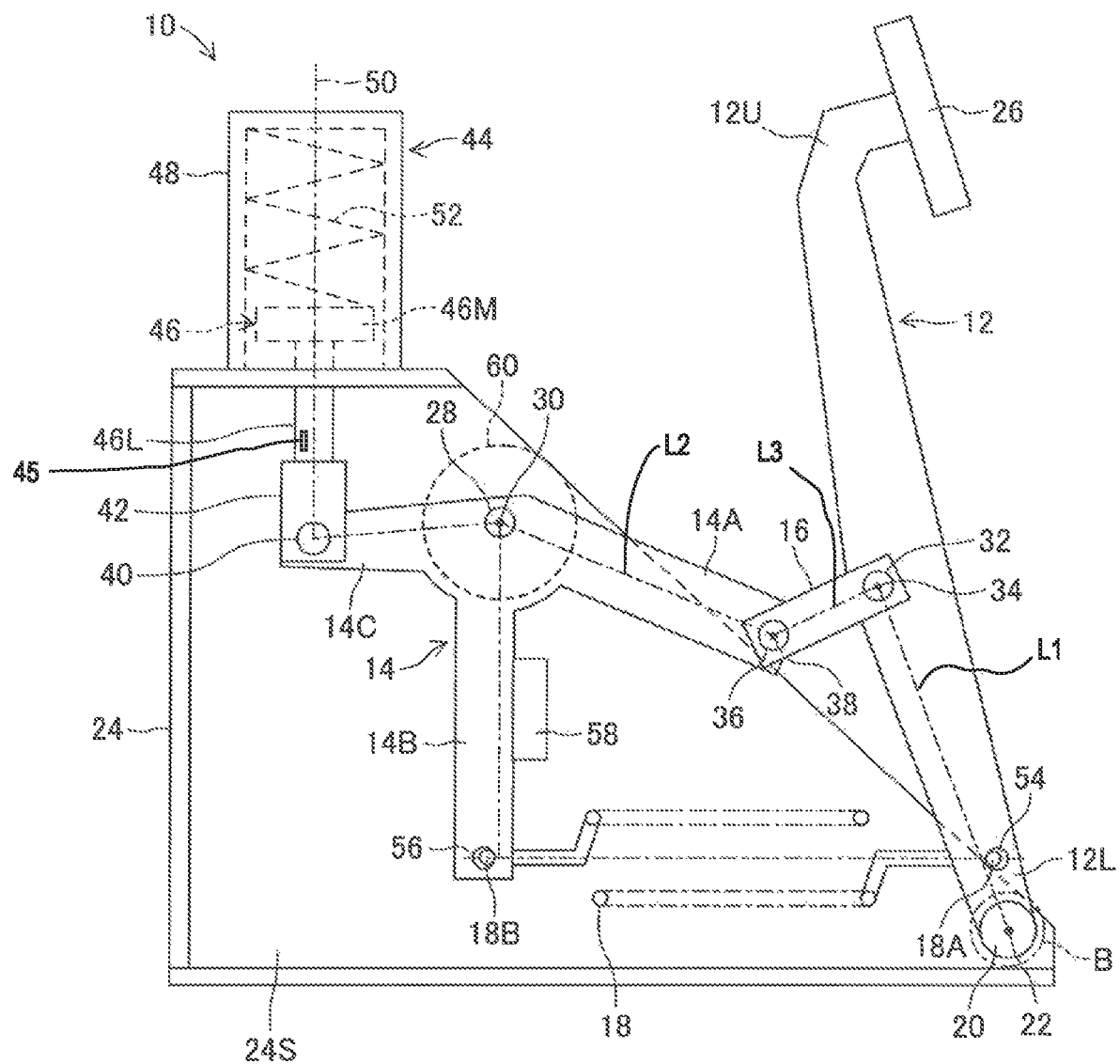
FIG. 1 is a side view showing a first embodiment of a pedal device for a vehicle according to the present disclosure when first and second links are in their standard positions.

The present disclosure will now be described in detail with reference to the accompanying drawings.

First Embodiment

The pedal device 10 for a vehicle according to the first embodiment includes a first link 12, a second link 14, a third link 16, and a return spring 18. The pedal device 10 may be any pedal device for a vehicle that is depressed by a foot of a driver. For example, the pedal device may be any of a brake pedal device, an accelerator pedal device, and a one-pedal type pedal device that can operate both a brake and an accelerator.

The first link 12 is pivotally supported at one end (lower end as viewed in FIG. 1) 12L by a support member 24 about a first axis 22 by way of a pivot shaft 20 extending substantially horizontally. The first link 12 extends so as to be inclined such that the other end (the upper end as viewed in FIG. 1) 12U is located on the front side (the left side in FIG. 1) of a vehicle than the one end 12L.

The support member 24 has a pair of side wall portions 24S that are spaced from each other in the direction perpendicular to a paper surface of FIG. 1. The pivot shaft 20 is integrally provided at the one end 12L and protrudes on both sides of the first link 12 along the first axis 22. Although not shown in FIG. 1, the pivot shaft 20 is inserted through a pair of resin-made or metal-made bushes B inserted into holes provided in the pair of side wall portions 24S, and the pivot shaft 20 is supported by the bushes rotatably about the first axis 22.

In the first embodiment, the other end (the upper end as viewed in FIG. 1) 12U of the first link 12 is integrally provided with a pedal portion 26 that receives the foot of the driver. The first link 12 pivots about the first axis 22 when a pedaling force of the driver is received by the pedal portion 26 which is a portion on the other end side with respect to the first axis 22.

The second link 14 is pivotally supported by the support member 24 by way of a pivot shaft 28 about a second axis 30 parallel to the first axis 22. The pivot shaft 28 is integrally fixed to the second link 14 and projects on both sides of the second link 14 along the second axis 30. Although not shown in FIG. 1, the pivot shaft 28 is inserted through a pair of resin-made or metal-made bushes inserted into holes provided in the pair of side wall portions 24S, and is supported by the bushes rotatably about the second axis 30.

As shown in FIG. 1, the second link 14 has first, second and third arm portions 14A, 14B and 14C. The first arm portion 14A is inclined downward with respect to the pivot shaft 28 and extends in a direction approaching the first link 12. The second arm portion 14B extends substantially downward with respect to the pivot shaft 28, and the third arm portion 14C extends substantially horizontally in a direction away from the first link 12.

The third link 16 is a connecting link that is pivotally attached to the first link 12 and the first arm portion 14A of the second link 14, thereby connects these links. In particular, one end of the third link 16 is pivotally supported about an axis 34 parallel to the first axis 22 by a pivot shaft 32 fixed to the first link 12 between the first axis 22 and the pedal portion 26. The other end of the third link 16 is pivotally supported by a pivot shaft 36 fixed to the tip of the first arm portion 14A about an axis 38 parallel to the second axis 30.

Therefore, the third link 16 transmits force and displacement between the first link 12 and the first arm portion 14A of the second link 14 to pivot the second link 14 about the second axis 30. The axis 34 may be considered as a position at which force and displacement are transmitted between the first link 12 and the second link 14.

In the first embodiment, the tip of the third arm portion 14C of the second link 14 is pivotally attached to a lower end of a rod portion 46L of a piston 46 of a reaction force device 44 by a pivot shaft 40 and a yoke member 42. The reaction force device 44 has a substantially cylindrical housing 48 fixed to the support member 24 and closed at the upper end, and a main body portion 46M of the piston 46 is reciprocally arranged in the housing 48 along a vertical axis 50.

A compression coil spring 52 is arranged in the housing 48 between the main body portion 46M and an upper end wall of the housing 48. When the first link 12 pivots counterclockwise about the first axis 22 as viewed in FIG. 1 and the second link 14 pivots clockwise about the second axis 30, the compression coil spring 52 generates a reaction force against the pivotal movements due to an increase in compression deformation amount. In the following description, the clockwise and counterclockwise directions are the clockwise and counterclockwise directions when viewed in FIG. 1, respectively.

The return spring 18 is a tension coil spring that generates a tensile force that increases as an amount of elastic deformation of extension increases. The return spring 18 is provided between the first link 12 and the lower end of the second arm portion 14B of the second link 14 in a state of being elastically extended as compared with a free state. The return spring 18 has hook-shaped first and second ends 18A and 18B. The first end 18A (the right end as viewed in FIG. 1) is locked in a hole 54 provided in the first link 12 between the first axis 22 and the axis 34 and close to the first axis 22, and the second end 18B is locked in a hole 56 provided at the lower end of the second arm portion 14B. Therefore, the first end 18A of the return spring 18 is connected to the first link 12 between the position at which force and displacement are transmitted between the first link 12 and the third link 16 and the first axis 22. The second end 18B is connected to the second link 14 at a position spaced downward from the second axis 30.

The return spring 18 biases the second link 14 in the counterclockwise direction as viewed in FIG. 1 about the second axis 30. Therefore, when the first link 12 is not receiving a pedaling force at the pedal portion 26, the second arm portion 14B engages with a stopper 58 provided on one of the side wall portions 24S of the support member 24, whereby the first link 12, the second link 14 and the third link 16 are positioned in their standard positions shown in FIG. 1. The standard positions of the first link 12 and the second link 14 are positions where the pivot angles of the links are zero.

Figure 2:
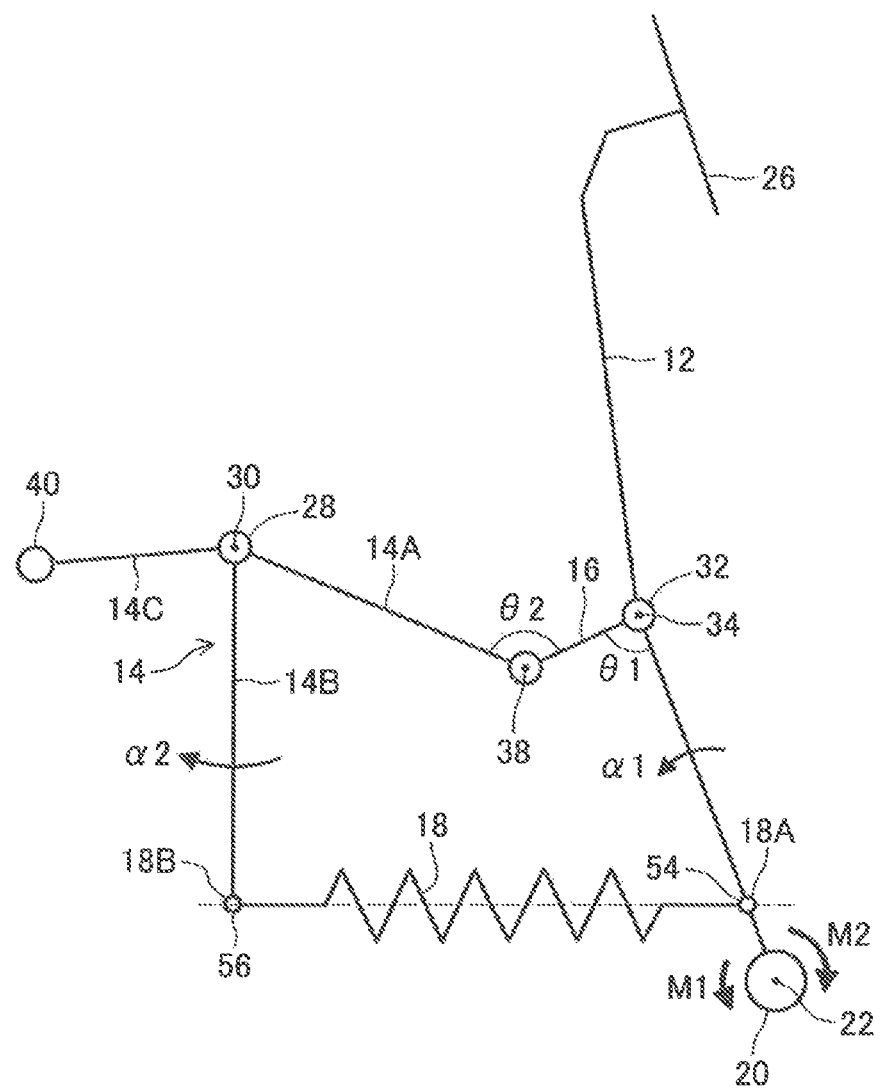
FIG. 2 is a skeleton diagram showing the pedal device of the first embodiment.

As shown in FIG. 2, the tensile force of the return spring 18 is transmitted to the first link 12 via the first end 18A, so that a counterclockwise moment M1 acts on the first link 12 about the first axis 22. Further, the tensile force of the return spring 18 is transmitted to the first link 12 via the second link 14 and the third link 16, so that a moment M2 in the clockwise direction acts on the first link 12.

The moment M2 is 0 when the first link 12 and the second link 14 are in their standard positions, but the moment M1 acts even when the first link 12 and the second link 14 are in their standard positions. Furthermore, the moments M1 and M2 also act in a situation where the first link 12 pivots about the first axis 22 and the second link 14 pivots about the second axis 30.

As will be described later, a pivot angle $\alpha 2$ of the second link 14 is larger than a pivot angle $\alpha 1$ of the first link 12 (see FIG. 2). Further, a distance between the second axis 30 and the hole 56 is greater than a distance between the first axis 22 and the hole 54. Thus, as the pivot angle of the first link 12 from the standard position increases, a distance between the first and second ends 18A and 18B of the return spring 18 increases, which in turn progressively increases the tensile force of the return spring 18, and thus forces that urge the first link 12 and the second link 14 to their standard positions.

As shown in FIG. 1, a distance between the first axis 22 of the pivot shaft 20 and the axis 34 of the pivot shaft 32 is much greater than a distance between the first axis 22 and the center of the hole 54. The moment M2 that pivots the first link 12 clockwise about the first axis 22 is greater than the moment M1 that pivots the first link 12 counterclockwise about the first axis 22. Therefore, when the first link 12 does not receive a pedaling force at the pedal portion 26, the first link 12 is also positioned in the standard position shown in FIG. 1.

In the first embodiment, the pivot shaft 28 of the second link 14 is connected to a rotation angle sensor 60, and the rotation angle sensor 60 is supported by the one of the side wall portions 24S. The rotation angle sensor 60 may be a rotary encoder that detects the pivot angle $\alpha 2$ of the pivot shaft 28 and the second link 14 about the second axis 30.

In some embodiments, a torque sensor 45 may be provided. The torque sensor 45 may be provided in the rod portion 46L of the piston 46 of the reaction force device 44, if necessary. The torque sensor 45 may detect a torque of the second link 14 about the second axis 30 and thus a pedaling force applied to the pedal portion 26 by detecting a compressive load on the rod portion 46L. When the torque sensor 45 is provided, the rotation angle sensor 60 may be omitted.

Although not shown in FIGS. 1 and 2, as viewed in the direction along the first axis 22, a line segment connecting the first axis 22 and the axis 34 is referred to as L1, a line segment connecting the second axis 30 and the axis 38 is referred to as L2, and a line segment connecting the axis 34 and the axis 38 is referred to as L3. An angle formed by the line segments L1 and L3 below them is referred to as $\theta 1$, and an angle formed by the line segments L2 and L3 above them is referred to as $\theta 2$ (see FIG. 2).

As shown in FIGS. 1 and 2, when the first link 12 and the second link 14 are in their standard positions, the angle 81 is slightly smaller than 90 degrees and the angle 82 is larger than 90 degrees and smaller than 180 degrees. When the first link 12 pivots in the counterclockwise direction about the first axis 22 by receiving a pedaling force of the driver at the pedal portion 26, the angle 81 gradually increases to 90 degrees and then gradually increases from 90 degrees. On the other hand, the angle 82 gradually decreases to 90 degrees and then gradually decreases from 90 degrees.

Figure 4:
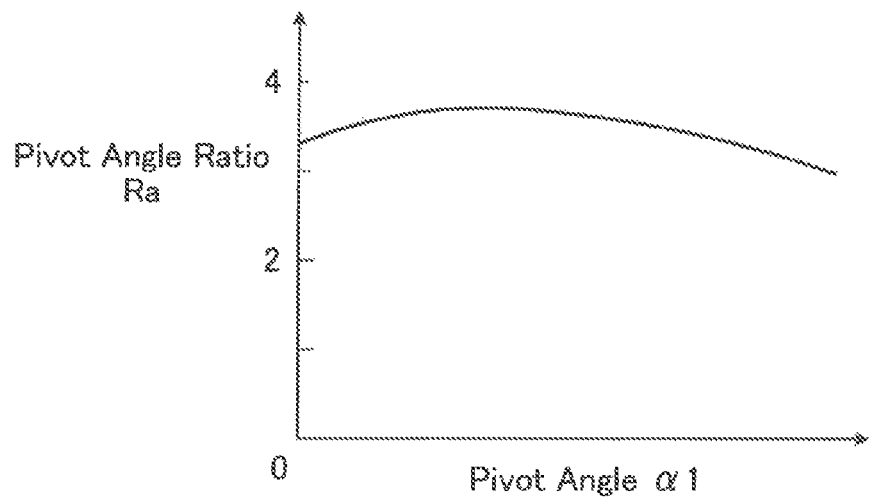
FIG. 4 is a graph showing a relationship between a pivot angle $\alpha 1$ of the first link and a ratio Ra of a pivot angle $\alpha 2$ of the second link to the pivot angle $\alpha 1$ of the first link in the first embodiment.

A ratio $\alpha 2/\alpha 1$ of the pivot angle $\alpha 2$ of the pivot shaft 28 about the second axis 30 to the pivot angle $\alpha 1$ of the first link 12 about the first axis 22 is defined as a pivot angle ratio Ra. A relationship of the pivot angle ratio Ra against the pivot angle $\alpha 1$ is an upwardly curved relationship as shown in FIG. 4. Since the pivot angle $\alpha 2$ is larger than the pivot angle $\alpha 1$, the pivot angle ratio Ra is larger than 1. The relationship of the pivot angle ratio Ra against the pivot angle $\alpha 1$ may be different from the relationship shown in FIG. 4.

Second Embodiment

Figure 3:
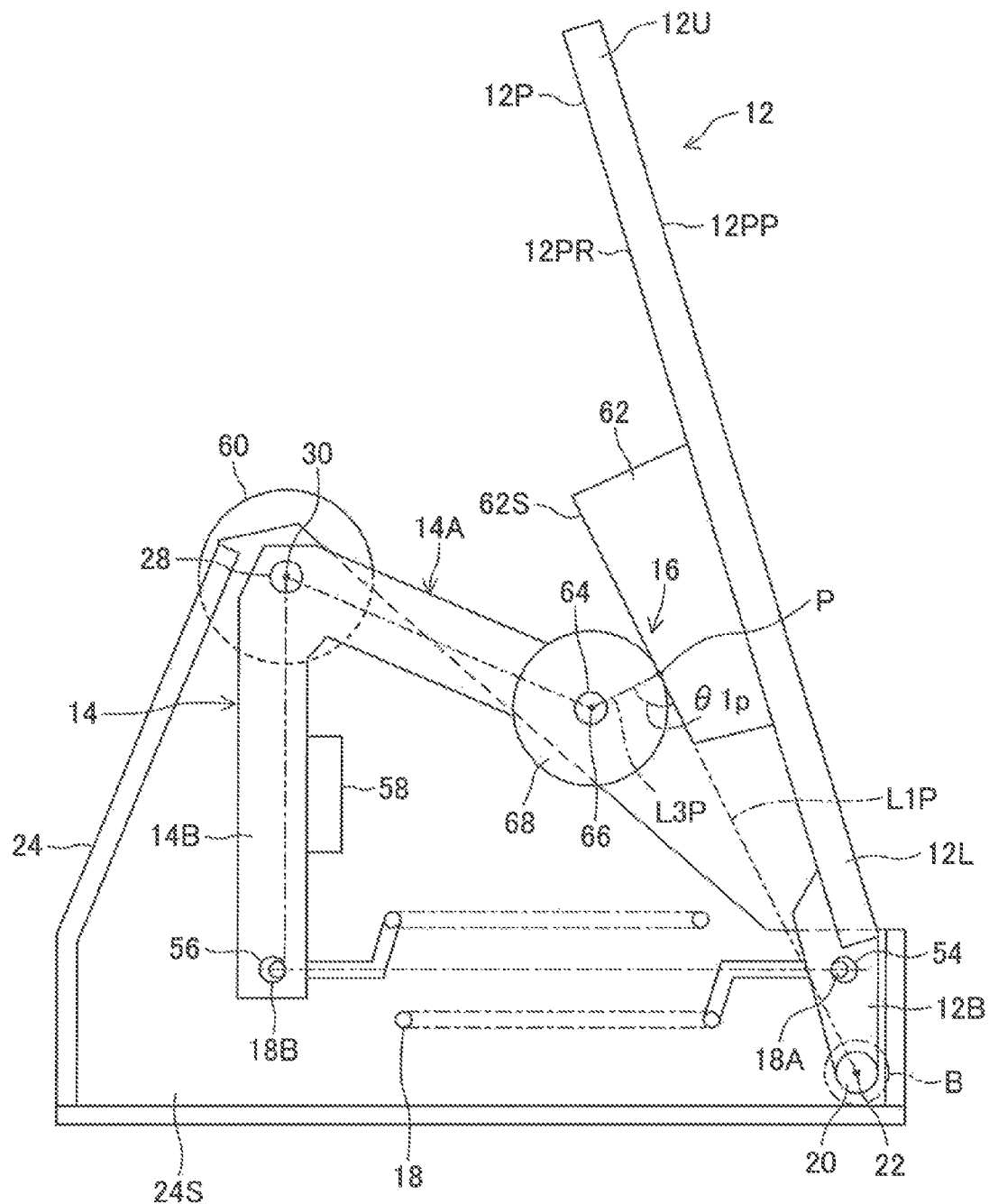
FIG. 3 is a side view showing a second embodiment of the pedal device for a vehicle according to the present disclosure when first and second links are in their standard positions.

FIG. 3 is a side view showing a second embodiment of the pedal device 10 for a vehicle according to the present disclosure. In FIG. 3, the same members as those shown in FIG. 1 are designated by the same reference numerals as those shown in FIG. 1.

In the second embodiment, the first link 12 includes a substantially flat plate member 12P and a bracket 12B fixed to the lower end of the plate member. The pivot shaft 20 is provided integrally with the bracket 12B, and the hole 54 into which the first end 18A of the return spring 18 is locked is also provided in the bracket 12B. The first link 12 does not have the pedal portion 26 provided in the first embodiment, and a pedaling surface 12PP that is the upper surface of the first link 12 receives a pedaling force of a foot of a driver. A roller contact member 62 is fixed to a lower surface 12PR opposite to the pedaling surface 12PP.

The second link 14 has the first and second arm portions 14A and 14B, but does not have the third arm portion 14C, and the reaction force device 44 is not provided. A roller support shaft 64 is integrally provided at the tip of the first arm portion 14A, and a rotation axis 66 of the roller support shaft 64 extends parallel to the second axis 30. The roller support shaft 64 rotatably supports a roller 68 about the rotation axis 66, and a surface of the roller 68 extends in a cylindrical shape about the rotation axis 66, and is in contact with a roller contact surface 62S of the roller contact member 62.

The second link 14 is biased in the counterclockwise direction about the second axis 30 by the tensile force of the return spring 18 as in the first embodiment, so that the roller 68 is pressed against the roller contact surface 62S by the second link 14. Therefore, when the first link 12 pivots about the first axis 22, the roller 68 rolls in contact with the roller contact surface 62S.

Therefore, the roller contact member 62 and the roller 68 cooperate with each other to function as a third link 16 for transmitting force and displacement between the first link 12 and the second link 14, similarly to the third link 16 in the first embodiment. Further, a contact point P between the roller 68 and the roller contact surface 62S is a position where force and displacement are transmitted between the first link 12 and the second link 14.

As shown in FIG. 3, as viewed in the direction along the first axis 22, a line segment connecting the first axis 22 and the contact point P is designated as L1$p$, and a line segment connecting the rotation axis 66 and the contact point P when each link is in the standard position is designated as L3$p$. An angle θ1$p$ formed by the line segment L1$p$ and the line segment L3$p$ below them is 90 degrees. In the second embodiment, the roller contact surface 62S has a planar shape extending along the line segment L1$p$ and perpendicular to the paper surface of FIG. 3. Therefore, an angle formed by the line segment L3$p$ with respect to the roller contact surface 62S is also 90 degrees. This angle is always 90 degrees no matter how the pivot angle α1 of the first link 12 about the first axis 22 and the pivot angle α2 of the link 14 about the second axis 30 change. Therefore, as compared to where the angle θ1$p$ formed by the line segment L1$p$ and the line segment L3$p$ is an angle other than 90 degrees, force and displacement are efficiently transmitted between the first link 12 and the roller 68.

Notably, the roller contact surface 62S may be a flat surface extending obliquely with respect to the line segment L1$p$ or may be a curved surface. Also in those cases, an angle formed by the line segment L3$p$ connecting the rotation axis 66 and the contact point P with respect to the roller contact surface 62S at the contact point P is always 90 degrees.

Effects of the Embodiments

According to the first and second embodiments, the first end 18A of the return spring 18 is connected to the first link 12 on the side of the first axis 22 with respect to the axis 34 or the contact point P at which force and displacement are transmitted between the first link 12 and the third link 16. The second end 18B of the return spring 18 is connected to the second link 14 at a position spaced from the second axis 30. Further, the moment M2 in which the tensile force of the return spring 18 pivots the first link 12 to the standard position via the second link 14 and the third link 16 is greater than the moment M1 in which the tensile force of the return spring 18 pivots the first link 12 away from the standard position via the first end 18A.

As a result, the first link 12 is biased to the standard position by a difference between the second moment M2 and the first moment M1. Therefore, when the first link 12 is pivoted about the first axis 22 by a driver, a reaction force against the pivoting can be generated by the difference between the moments M2 and M1 and the first link 12 can be reliably returned to the standard position when the pedaling force of the driver is released.

When the first link 12 is pivoted about the first axis 22 by the driver, a pedaling force is applied to the first link 12 by the driver so that a force that overcomes a force transmitted from the return spring 18 to the first link 12 via the second link 14 and the third link 16 acts on the third link 16 from the first link 12. On the other hand, a force transmitted to the first link 12 via the first end 18A is not affected by a pedaling force applied to the first link 12 by the driver.

Figure 5:
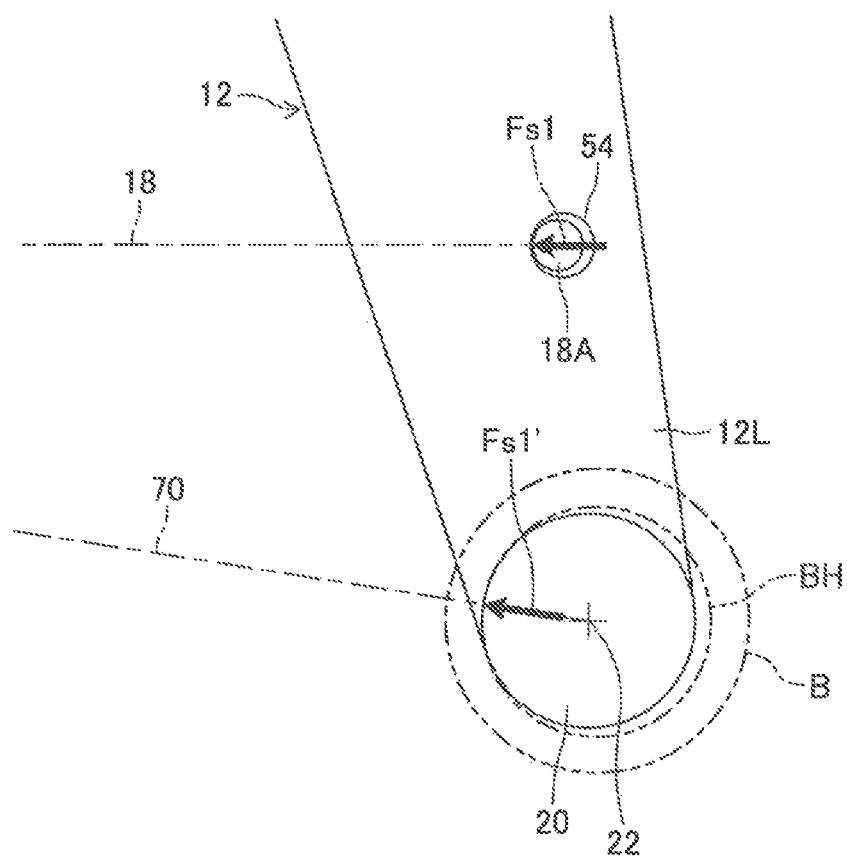
FIG. 5 is a view for explaining an action preventing rattling of the first link in the first and second embodiments.

As a result, as shown in FIG. 5, a force component Fs1' is generated along a straight line 70 connecting the first axis 22 and the second end 18B of the return spring 18 by a force Fs1 transmitted to the first link 12 via the first end 18A. The force component Fs1' keeps the pivot shaft 20 and the surface of the hole BH of the bush B receiving the pivot shaft 20 pressed to each other. Accordingly, it is possible to prevent the rattling of the first link 12 due to the relative displacement of the pivot shaft 20 in the direction perpendicular to the first axis 22 with respect to the hole receiving the pivot shaft 20 when the first link 12 is pivoted. It is to be noted that in FIG. 5 and FIG. 6 described later, a gap between the pivot shaft 20 and the surface of the hole BH of the bush B is exaggeratedly illustrated for the purpose of explanation.

Thus, the return spring 18 performs both functions of urging the first link 12 to the standard position and keeping the pivot shaft 20 and the surface of the hole BH receiving the pivot shaft 20 pressed to each other to prevent the rattling of the first link 12. Therefore, it is not necessary to additionally provide techniques for preventing the rattling of the first link 12 in addition to the return spring 18, so that the rattling can be prevented over a long period of time without increasing the complexity of the structure and the cost of the pedal device 10.

According to the first and second embodiments, the first end 18A of the return spring 18 connected to the first link 12 is located between the first axis 22 and the axis 34 or the contact point P at which force and displacement are transmitted between the first link 12 and the third link 16. Therefore, even if the first link 12 pivots, the tensile force of the return spring 18, which is transmitted to the first link 12 through the first end 18A, does not generate a moment that pivots the first link 12 to the standard position in the same manner as the moment M2. Accordingly, in a situation where the driver applies a pedaling force to the first link 12, it is possible to prevent the rattling of the first link 12 from being caused due to the force transmitted to the first link 12 via the first end 18A failing to press the pivot shaft 20 and the surface of the hole BH receiving the pivot shaft 20 to each other.

Further, according to the first and second embodiments, a distance between the first end 18A and the first axis 22 is smaller than a distance between the second end 18B and the second axis 30. The ratio α2/α1 of the pivot angle α2 of the second link 14 to the pivot angle α1 of the first link 12 is greater than 1. Further, as the pivot angle α1 of the first link 12 increases, a distance between the first end 18A and the second end 18B increases. Therefore, the tensile force of the return spring 18 increases as the pivot angle of the first link 12 increases, so that the force for returning the first link 12 to the standard position can be increased and the effect of preventing the rattling of the first link 12 can be increased.

Further, according to the first and second embodiments, when the first link 12 does not receive a pedaling force of the driver, the second link 14 engages with the stopper 58 at the position spaced from the second axis 30, thereby the first link 12 and the second link 14 are positioned in their respective standard positions. Therefore, a stopper that engages with the first link 12 at a portion spaced apart from the first axis 22 is not required, so that the structure of the first link 12 can be simplified.

Further, according to the first and second embodiments, at least one of a pivot angle of the second link 14 about the second axis 30 and a torque of the second link 14 about the second axis 30 is detected by the detection device such as the rotation angle sensor 60. The pivot angle ($\alpha$2) of the second link 14 has a certain relationship with the pivot angle $\alpha$1 of the first link 12 and a stroke of the portion of the first link 12 that receives the pedaling force, and the torque of the second link 14 about the second axis 30 has a certain relationship with a torque of the first link 12 about the first axis 22 and the pedaling force applied to the first link 12. Therefore, it is possible to detect at least one of the pivot angle $\alpha$1 of the first link 12, a stroke of the portion of the first link 12 that receives the pedaling force, the torque of the first link 12, and the pedaling force applied to the first link 12.

In particular, according to the first embodiment, by a reaction force generated by the reaction force device 44 supported by the support member 24, the second link 14 is urged in a direction in which the pivot angle $\alpha$2 thereof decreases, and a biasing force due to the reaction force is also transmitted to the first link 12 via the second link 14 and the third link 16, and biases the first link 12 to the standard position. Thus, the first link 12 is urged to the standard position by both an urging force by the tensile force of the return spring 18 and an urging force by the reaction force generated by the reaction force device 44. Therefore, the first link 12 can be effectively biased to the standard position without increasing the tensile force of the return spring 18, which enables to increase the degree of freedom in setting the force for pressing the pivot shaft 20 and the surface of the hole BH receiving the pivot shaft 20 to each other by a force transmitted to the first link 12 via the first end 18A.

Further, according to the first embodiment, the third link 16 is a connecting link pivotally attached to the first link 12 at one end and pivotally attached to the second link 14 at the other end. Thus, the connecting link can transmit the force and displacement between the first link 12 and the second link 14, causing the second link 14 to pivot about the second axis 30 in the direction opposite to that of the first link 12.

Further, according to the second embodiment, when the first link 12 pivots about the first axis 22, the roller 68, which rotatably supported by the second link 14 about the rotation axis 66 parallel to the second axis 30, rolls in contact with the roller contact surface 62S of the roller contact member 62 fixed to the first link 12. Therefore, the roller 68 and the roller contact surface 62S cooperates with each other to function as a third link that transmits force and displacement between the first link 12 and the second link 14, and can pivot the second link 14 about the second axis 30 in the opposite direction to the first link 12.

Modified Example

Figure 6:
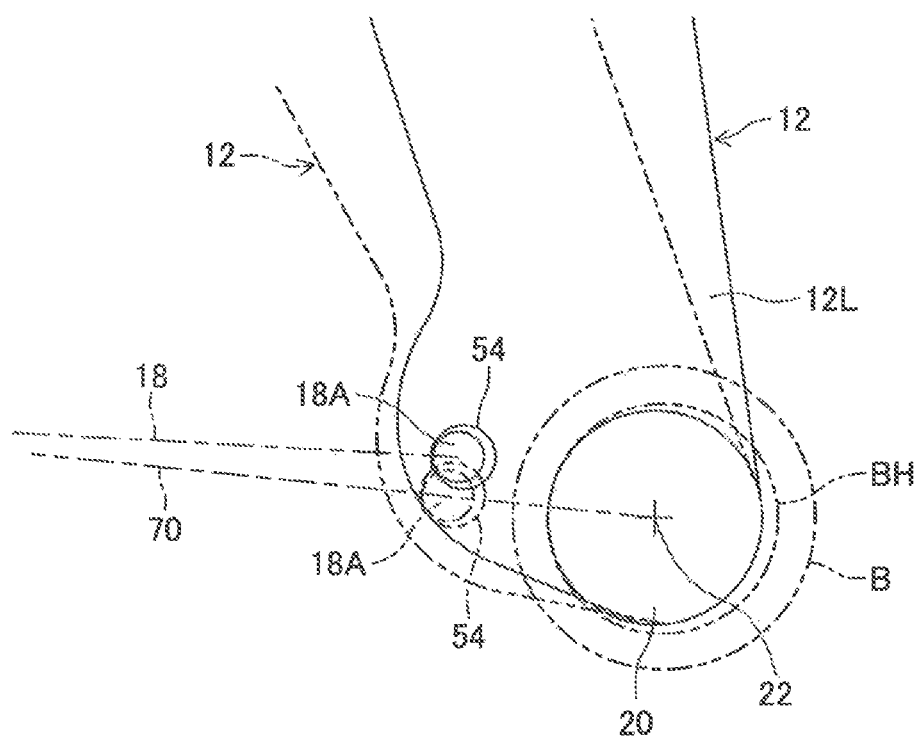
FIG. 6 is an enlarged partial side view showing a modified example of the pedal device for a vehicle according to the present disclosure, which is configured as a modified example of the first embodiment.

In the modified example shown in FIG. 6, the hole 54 into which the first end 18A of the return spring 18 is locked is provided in the first link 12 at a position closer to the first axis 22 than the hole 54 in the first embodiment. As shown in phantom in FIG. 6, the first end 18A and the hole 54 are located on a straight line 70 connecting the first axis 22 and the second end 18B of the return spring 18 when the pivot angle $\alpha$1 of the first link 12 is a maximum allowable angle $\alpha$1 max (not shown). The maximum allowable angle $\alpha$1 max may be an angle at which the second link 14 engages with a stopper (not shown) or the first link 12 engages with a stopper (not shown).

According to the modification, the first end 18A of the return spring 18 connected to the first link 12 is located on the straight line 70 connecting the first axis 22 and the second end 18B when the pivot angle $\alpha$1 of the first link 12 is the maximum allowable angle $\alpha$1 max. Therefore, as compared to where the first end 18A is closer to the other end of the first link 12 than the straight line 70 connecting the first axis 22 and the second end 18B even when the pivot angle $\alpha$1 of the first link 12 is the maximum allowable angle, it is possible to reduce the first moment M1 and increase the force that presses the pivot shaft 20 and the surface of the hole BH receiving the pivot shaft 20 to each other by the tensile force transmitted to the first link 12 via the first end 18A. Accordingly, the first link 12 can be effectively returned to the standard position, and rattling of the first link 12 can be effectively prevented.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first and second embodiments, the pivot shaft 20 is integrally provided at the one end 12L of the first link 12 and is inserted into a pair of bushes B inserted into holes provided in the pair of side wall portions 24S of the support member 24, and is rotatably supported about the first axis 22 by the bushes B. However, the pivot shaft 20 may be inserted into the holes provided in the pair of side wall portions 24S without the intervention of any bush.

A bush may be attached to the one end 12L of the first link 12, and the pivot shaft 20 may be fixed to at least one of the pair of side wall portions 24S while being inserted into the bush. In that case, the support member 24 may have only one side wall portion 24S, and the pivot shaft 20 may be supported by the side wall portion 24S in a cantilever manner.

Although in the above-described first embodiment, the reaction force device 44 is provided, and the reaction force device 44 applies a reaction force to the first link 12 via the second link 14 and the third link 16, but the reaction force device 44 may be omitted. Conversely, the third arm portion 14C and the reaction force device 44 may be provided in the above-described second embodiment, as in the first embodiment.

What is claimed is:

1. A pedal device for a vehicle including a first link that is pivotally supported by a support member at one end so as to be pivotable about a first axis of a pivot shaft inserted into at least one hole and receives a pedaling force of a driver at a portion on the other end side with respect to the first axis, and a return spring that biases the first link about the first axis toward a standard position in which a pivot angle of the first link is zero, wherein the pedal device for a vehicle further includes a second link pivotally supported by the support member so as to be pivotable about a second axis parallel to the first axis, and a third link configured to pivot the second link about the second axis in a direction opposite to that of the first link by transmitting force and displacement between the first link and the second link, the return spring is a spring that generates a tensile force by being elastically extended as compared with a free state, and has a first end connected to the first link on the side of the first axis with respect to a position at which force and displacement are transmitted between the first link and the third link and a second end connected to the second link at a position spaced from the second axis, and a moment in which a tensile force of the return spring pivots the first link toward the standard position via the second and third links is greater than a moment in which the tensile force of the return spring pivots the first link away from the standard position via the first end.

2. The pedal device for a vehicle according to claim 1, wherein the first end is connected to the first link between a position at which force and displacement are transmitted between the first link and the third link and the first axis.

3. The pedal device for a vehicle according to claim 2, wherein the first end is located on a straight line connecting the first axis and the second end when a pivot angle of the first link is a maximum allowable angle.

4. The pedal device for a vehicle according to claim 1, wherein a distance between the first end and the first axis is less than a distance between the second end and the second axis, a ratio of a pivot angle of the second link to a pivot angle of the first link is greater than 1, and a distance between the first and second ends increases as the pivot angle of the first link increases.

5. The pedal device for a vehicle according to claim 1, wherein the support member is provided with a stopper, and, when the first link does not receive a pedaling force of the driver, the second link engages with the stopper at a position spaced from the second axis, whereby the first link is positioned in the standard position and the second link is positioned in its standard position.

6. The pedal device for a vehicle according to claim 1, wherein the pedal device for a vehicle is provided with a detection device that is configured to detect at least one of a pivot angle of the second link about a second axis and a torque of the second link about the second axis.

7. The pedal device for a vehicle according to claim 1, wherein the pedal device for a vehicle is provided with a reaction force device that is supported by the support member and is configured to generate a reaction force that urges the second link in a direction in which a pivot angle of the second link decreases.

8. The pedal device for a vehicle according to claim 1, wherein the third link is a connecting link pivotally attached to the first link at one end and pivotally attached to the second link at the other end.

9. The pedal device for a vehicle according to claim 1, wherein the third link includes a roller rotatably supported by the second link about a rotation axis parallel to the second axis, and a roller contact surface provided on the first link, and the roller is configured to roll in contact with the roller contact surface when the first link pivots about the first axis.

* * * * *